(12) United States Patent
Horimatsu et al.

(10) Patent No.: US 7,547,061 B2
(45) Date of Patent: Jun. 16, 2009

(54) ATTACHMENT STRUCTURE OF EA COMPONENT

(75) Inventors: Toshiyuki Horimatsu, Yokohama (JP); Masatoshi Sato, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 331 days.

(21) Appl. No.: 10/530,324

(22) PCT Filed: Oct. 6, 2003

(86) PCT No.: PCT/JP03/12765

§ 371 (c)(1), (2), (4) Date: Aug. 22, 2005

(87) PCT Pub. No.: WO2004/033930

PCT Pub. Date: Apr. 22, 2004

(65) Prior Publication Data

US 2006/0125286 A1 Jun. 15, 2006

(30) Foreign Application Priority Data

| Oct. 10, 2002 | (JP) | ............................. 2002-297653 |
| Oct. 10, 2002 | (JP) | ............................. 2002-297654 |
| Oct. 10, 2002 | (JP) | ............................. 2002-297655 |
| Dec. 12, 2002 | (JP) | ............................. 2002-361070 |
| Sep. 1, 2003 | (JP) | ............................. 2003-308922 |

(51) Int. Cl.
*B60N 99/00* (2006.01)

(52) U.S. Cl. ............................. 296/187.03; 296/187.01; 296/187.02

(58) Field of Classification Search ................. 296/39.1, 296/146.7, 214, 153, 187.01, 187.02, 187.03, 296/187.09, 187.1, 187.11, 187.12, 187.13; 24/297, 324; 52/511; 411/338, 339, 508, 411/509, 510, 913; 428/99, 131, 134, 136, 428/156, 192, 220; 293/128, 132, 133, 135, 293/136; 188/371, 377
See application file for complete search history.

(56) References Cited

U.S. PATENT DOCUMENTS 3,680,272 A    8/1972  Meyer
(Continued)

FOREIGN PATENT DOCUMENTS

DE          44 27 482 A1   2/1995
(Continued)

OTHER PUBLICATIONS

Japanese Office Action dated Jun. 3, 2008 (JP 2002-297653) (2 pages).
(Continued)

*Primary Examiner*—Lori L Lyjak
(74) *Attorney, Agent, or Firm*—Sughrue Mion, PLLC

(57) ABSTRACT

In an attachment structure of an EA component, the EA component composed of a synthetic resin such as rigid urethane foam is attached to a trim serving as a member, with a first locking part therebetween. The first locking part includes a cylindrical part, an anchor, a flange, and a plurality of projections. The anchor has a flange shape extending from the rear end of the cylindrical part toward the outside. The flange extends from the leading end of the cylindrical part toward the outside. The projections protrude from the leading end of the cylindrical part in the direction parallel to the axis of the cylindrical part. The EA component is attached to the trim by setting the EA component on the trim while the projections are inserted in an opening.

47 Claims, 11 Drawing Sheets

U.S. PATENT DOCUMENTS

| | | | |
|---|---|---|---|
| 4,363,839 A * | 12/1982 | Watanabe et al. | 428/31 |
| 4,871,205 A * | 10/1989 | Bray | 293/128 |
| 4,932,105 A | 6/1990 | Muller | |
| 5,601,899 A | 2/1997 | Campbell | |
| 5,934,729 A | 8/1999 | Baack | |
| 6,378,931 B1 * | 4/2002 | Kolluri et al. | 296/146.15 |

FOREIGN PATENT DOCUMENTS

| | | |
|---|---|---|
| EP | 1 104 689 A1 | 6/2001 |
| FR | 2 779 785 A1 | 12/1999 |
| GB | 2 084 942 A | 4/1982 |
| JP | 58-36613 | 9/1981 |
| JP | 60-175924 | 11/1985 |
| JP | 62-95930 U | 6/1987 |
| JP | 62-34015 | 8/1987 |
| JP | 3-52221 U | 5/1991 |
| JP | 4-131113 A | 5/1992 |
| JP | 5-305630 A | 11/1993 |
| JP | 6-2705 A | 1/1994 |
| JP | 7-19636 U | 4/1995 |
| JP | 7-145840 | 6/1995 |
| JP | 8-72670 A | 3/1996 |
| JP | 11-13717 A | 1/1999 |
| JP | 2001-88624 A | 4/2001 |
| WO | WO 98/04438 A1 | 2/1998 |

OTHER PUBLICATIONS

Japanese Office Action dated Aug. 26, 2008 (JP 2002-297653) (2 pages).

Japanese Office Action dated Jun. 3, 2008 (JP 2002-297655) (2 pages).

Japanese Office Action dated Aug. 26, 2008 (JP 2002-297655) (2 pages).

International Search Report.

* cited by examiner

ATTACHMENT STRUCTURE OF EA COMPONENT

CROSS REFERENCE TO RELATED APPLICATION

This application is a 371 of PCT/JP03/12765 filed on Oct. 6, 2003.

BACKGROUND OF THE INVENTION

1. Field of the Invention

The present invention relates to an attachment structure of an impact energy-absorbing (EA) component, and in particular, to an attachment structure of an EA component that can be suitably applied to a trim or a roof component of automobiles.

2. Description of the Related Art

For the purpose of the impact energy absorption (EA) in case of side-on collision (i.e., side impact), an EA component composed of rigid urethane foam is attached to a door trim or a roof of automobiles. In a method for attaching an EA component composed of rigid urethane foam to a door trim, Japanese Unexamined Patent Application Publication No. 2001-322507 discloses the structure shown in FIGS. 3, 4a, and 4b. FIG. 3 is a cross-sectional view showing the attachment structure of an EA component disclosed in FIG. 7 in the above-cited patent document, FIG. 4a is a perspective view of a cylindrical body 20 used in this structure, and FIG. 4b is a sectional perspective view of the cylindrical body 20.

The cylindrical body 20 includes a cylindrical part 21 and an overhang section 22 that is integrated with the cylindrical part 21. A claw part 23 is provided at the end of the cylindrical part 21 toward the inside direction. A rod 26 is disposed on a trim 31 in an extending manner. A recess 27 is provided at the periphery of the rod 26 and the claw part 23 is engaged with the recess 27.

The cylindrical part 21 includes slits 24 extending from the leading end thereof in the direction parallel to the central axis. Accordingly, the shape of the cylindrical part 21 can be resiliently changed in the expanding radial direction.

In order to attach an EA component 33 to the trim 31, the EA component 33 is disposed on the trim 31 such that the rod 26 is inserted in an attachment hole 34 of the EA component 33. Subsequently, the cylindrical body 20 is pressed on the attachment hole 34 so as to be engaged with the rod 26, thereby engaging the claw part 23 with the recess 27. Thus, the overhang section 22 holds down the periphery of the attachment hole 34 of the EA component 33.

The cylindrical part 21 has a tapered shape so as to be inserted in the attachment hole 34 easily. When the cylindrical body 20 is fitted to the rod 26, the outer periphery of the cylindrical part 21 is closely contacted with the inner periphery of the attachment hole 34.

In the above attachment structure of the EA component, the process for attaching the EA component on the trim 31 requires two steps including a step of disposing the EA component on the trim 31 and a subsequent step of engaging the cylindrical body 20 with the rod 26. Therefore, this process is time consuming.

SUMMARY OF THE INVENTION

Accordingly, it is an object of the present invention to provide an attachment structure of an EA component in which the workability for attaching the EA component to a member such as a trim is significantly improved.

According to an attachment structure of an EA component of the present invention, in an attachment structure for attaching the EA component to a member, the EA component is attached to the member by engaging a first locking part that is integrated with the EA component with a second locking part provided in the member.

According to this attachment structure of an EA component, the first locking part is integrated with the EA component. Therefore, the EA component can be attached to the member by a single step of engaging the first locking part with the second locking part of the member while the EA component with the first locking part is set in the member.

According to a first aspect, the first locking part may be resiliently deformed, and when engaged with the second locking part, the first locking part may be resiliently deformed and may be then resiliently restored to engage with the second locking part. As a result, the first locking part can be readily attached to the second locking part.

According to the first aspect, the second locking part is preferably an opening. Such a second locking part composed of an opening can be readily provided at a desired position. In such a case, the first locking part preferably includes a claw part engaged with the edge of the opening. In particular, the first locking part preferably includes a projection projecting from the EA component and the claw part is preferably provided on the side face of the projection in the projecting direction. A plurality of the projections is preferably provided along the edge of the opening. According to this structure, the EA component can be attached to the member by setting the EA component in the member while the projections are inserted in the opening. Furthermore, since a plurality of the projections is provided along the edge of the opening, looseness (backlash) of the EA component in the direction parallel to the surface of the member can be prevented.

According to the first aspect, the first locking part preferably includes a flange and the edge of the opening is preferably held between the flange and the claw part. The formation of the flange can prevent looseness (backlash) of the EA component in the approaching or separating direction of the EA component and the member.

According to the first aspect, a base of the first locking part may be embedded in the EA component. This structure can increase the bonding strength of the first locking part and the EA component. The base of the first locking part may be provided so as not to pierce the EA component. This structure can increase the characteristics of shock absorption by the EA component in the vicinity of the first locking part.

According to the first aspect, the EA component is preferably composed of a synthetic resin, in particular, a foamed synthetic resin such as urethane foam. The first locking part can be strongly integrated with the EA component composed of such a synthetic resin by embedding the base of the first locking part.

In the production of such an EA component composed of a synthetic resin, the first locking part may be held with a die used for molding the EA component by a magnetic force. In such a case, the molding can be efficiently performed. Furthermore, when the first locking part includes the flange, the flange can be closely contacted with the die by the magnetic force, thereby preventing the generation of a burr.

This attachment structure of an EA component is preferably applied to attach a pad for the head protection or a pillar pad disposed along the interior surface of an automobile cabin. However, the application of the attachment structure of an EA component is not limited to the above.

According to a second aspect, the EA component is attached to the member by engaging a projection of the first locking part that is integrated with the EA component with a second locking part provided in the member. In addition, the rear end portion of the projection is surrounded by a surrounding wall.

According to the second aspect, the rear end portion of the projection is surrounded by the surrounding wall. Therefore, in the production of the EA component, this structure can prevent a material of the EA component (for example, a foamed synthetic resin) from flowing in the rear end portion of the projection.

According to the second aspect, the projection may be resiliently deformed, and when engaged with the second locking part, the projection may be resiliently deformed and may be then resiliently restored to engage with the second locking part. As a result, the projection can be readily attached to the second locking part.

According to the second aspect, the second locking part is preferably an opening. Such a second locking part composed of an opening can be readily provided at a desired position. In such a case, the projection of the first locking part preferably includes a claw part engaged with the edge of the opening. In particular, the claw part is preferably provided on the side face of the projection in the projecting direction. A plurality of the projections is preferably provided along the edge of the opening. According to this structure, the EA component can be attached to the member by setting the EA component in the member while the projections are inserted in the opening. Furthermore, since a plurality of the projections is provided along the edge of the opening, looseness (backlash) of the EA component in the direction parallel to the surface of the member can be prevented.

According to the second aspect, the first locking part preferably includes a flange, the projection and the surrounding wall are preferably disposed so as to be projected from the flange, and the edge of the opening is preferably held between the leading end of the surrounding wall and the claw part. This structure can prevent looseness (backlash) of the EA component in the approaching or separating direction of the EA component and the member.

According to the second aspect, a base of the first locking part may be embedded in the EA component. This structure can increase the bonding strength of the first locking part and the EA component. The base of the first locking part may be provided so as not to pierce the EA component. This structure can increase the characteristics of shock absorption by the EA component in the vicinity of the first locking part.

According to the second aspect, the EA component is preferably composed of a synthetic resin, in particular, a foamed synthetic resin such as rigid urethane foam. The first locking part can be strongly integrated with the EA component composed of such a synthetic resin by embedding the base of the first locking part.

In the production of such an EA component composed of a synthetic resin, the surrounding wall of the first locking part may be held with a die used for molding the EA component by fitting. In such a case, the molding can be efficiently performed. Furthermore, since the surrounding wall can be closely contacted with the die, a urethane or the like does not flow in the inside of the surrounding wall, thereby preventing the generation of a burr.

This attachment structure of an EA component is preferably applied to attach a pad for the side impact disposed along the interior surface of an automobile cabin. However, the application of the attachment structure of an EA component is not limited to the above.

A locking piece that can be used as the first locking part in the second aspect includes a base embedded in the EA component; a flange provided at one end of the base; a plurality of projections projected from the flange, the projections being able to be resiliently deformed, and the projections being inserted in an opening for attaching the EA component; claw parts provided on the side face of the projections, the claw parts being able to be engaged with the edge of the opening; and a surrounding wall projected from the flange in the same direction as that of the projections, the surrounding wall surrounding the rear end portion of the projections. This locking piece is preferably used for the above attachment structure of an EA component.

According to a third aspect, the first locking part includes a groove provided in the inner periphery of a tube-shaped opening in the circumferential direction. Such a first locking part having the groove can be readily provided at a desired position. In such a case, the second locking part preferably includes a claw part engaging with the edge of the groove. In particular, the second locking part is preferably a projection projecting from the member and the claw part is provided on the side face of the projection in the projecting direction. Furthermore, a plurality of the projections is preferably provided in the circumferential direction of the groove.

According to this attachment structure of an EA component, the EA component can be attached to the member by setting the EA component on the member while the projections are inserted in the tube-shaped opening. Furthermore, since the plurality of the projections is provided along the edge of the groove, looseness (backlash) of the EA component in the direction parallel to the surface of the member can be prevented.

According to the third aspect, the edge of the groove is preferably held between the member and the claw part. When the edge of the groove is held by the member and the claw part, looseness (backlash) of the EA component can be prevented in the approaching or separating direction of the EA component and the member.

According to the third aspect, most of the first locking part may be embedded in the EA component and only the leading end face of the first locking part may be projected from the EA component. This structure can increase the bonding strength of the first locking part and the EA component. The first locking part may be provided so as not to pierce the EA component. This structure can increase the characteristics of shock absorption by the EA component in the vicinity of the first locking part.

According to the third aspect, the opening may have a cylindrical shape, a rectangular tube shape, or another shape. When the opening has a rectangular tube shape, the second locking part inserted in the rectangular tube substantially has a rectangular column shape. Accordingly, the second locking part can be readily molded.

In such a rectangular tube opening, a section of the rectangular tube opening in the direction orthogonal to the central axis of the tube is preferably a rectangle and the groove is preferably provided in the direction of the long sides of the rectangle.

In particular, when the opening has the rectangular tube shape, the EA component is preferably attached to the member with a plurality of pairs of the second locking parts and the first locking parts, and at least two pairs of the second locking parts and the first locking parts are preferably disposed such that the directions of the long sides of the rectangle in the rectangular tube opening are orthogonal with respect to each other. This structure can effectively prevent looseness of the EA component in two orthogonal directions on the surface of the member such as a trim.

When the opening has the rectangular tube shape, the width of the claw part in the direction parallel to the groove may be smaller than the width of the groove. In such a case, even if the attaching position of the second locking part to the member or the attaching position of the first locking part to the EA component is somewhat offset from the intended position, the second locking part can be reliably engaged with the first locking part.

According to the third aspect, the inlet of the tube-shaped opening may have a tapered shape gradually tapered toward the inside. In this structure, the second locking part can be readily inserted in the first locking part. In such a case, the end of the inlet of the tube-shaped opening may extend in the direction substantially parallel to the central axis of the tube.

According to the third aspect, a part of the EA component may be in contact with the member such as a trim. In such a case, the EA component can be stably attached to the trim or the like.

According to the third aspect, the EA component is preferably composed of a synthetic resin. The first locking part can be strongly integrated with the EA component composed of such a synthetic resin by embedding most of the first locking part.

In the production of such an EA component composed of a synthetic resin, the first locking part may be held with a die used for molding the EA component by a magnetic force. In such a case, the molding can be efficiently performed.

This attachment structure of an EA component is preferably applied to attach a pad for the side impact disposed along the interior surface of an automobile cabin. However, the application of the attachment structure of an EA component is not limited to the above.

According to the third aspect, an EA component can be readily attached to a member such as a trim. According to the present invention, the characteristics of shock absorption by the EA component can be improved. In addition, the EA component can be reliably attached to the member regardless of the shape, the dimension, and the hardness of the EA component.

According to an attachment structure of an EA component of a fourth aspect, a non-woven fabric serving as the second locking part is preferably provided on the surface of the member, the surface to which the EA component being attached, and a planar fastener serving as the first locking part is preferably fixed on the surface of the EA component, the planar fastener being integrated with the EA component during the molding of the EA component with foaming. In this attachment structure, the EA component is preferably attached to the surface of the member by entwining the planar fastener with the non-woven fabric.

According to the fourth aspect, the planar fastener is provided on the surface of the EA component by integrating with the EA component. Therefore, the EA component can be attached by a single step of pressing the EA component with the planar fastener on the surface to be attached so as to entwine the planar fastener with the non-woven fabric provided on the surface.

Anchors of the planar fastener may be provided so as not to pierce the EA component. This structure can increase the characteristics of shock absorption by the EA component.

The attachment structure of an EA component according to the fourth aspect is preferably applied to attach the EA component to a roof trim of an automobile. However, this attachment structure of an EA component can be applied to attach the EA component to other surfaces to be attached.

BRIEF DESCRIPTION OF THE DRAWINGS

FIG. 2b is an enlarged view of a part of FIG. 2a;

FIG. 6b is an enlarged view of a part of FIG. 6a;

DESCRIPTION OF THE PREFERRED EMBODIMENTS

Figure 1A:
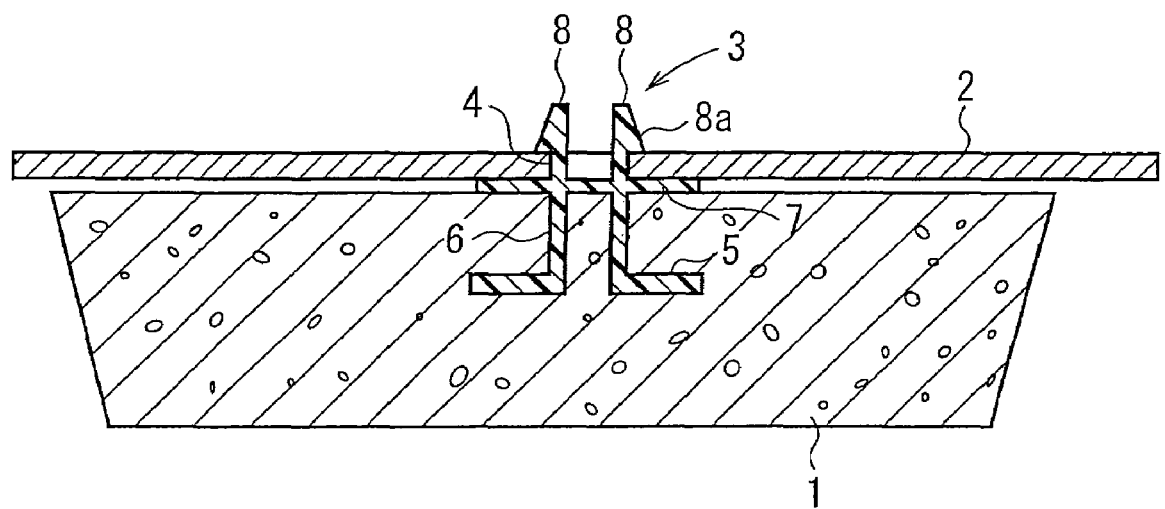
FIG. 1a is a cross-sectional view showing an attachment structure of an EA component according to a first aspect.
Figure 1B:
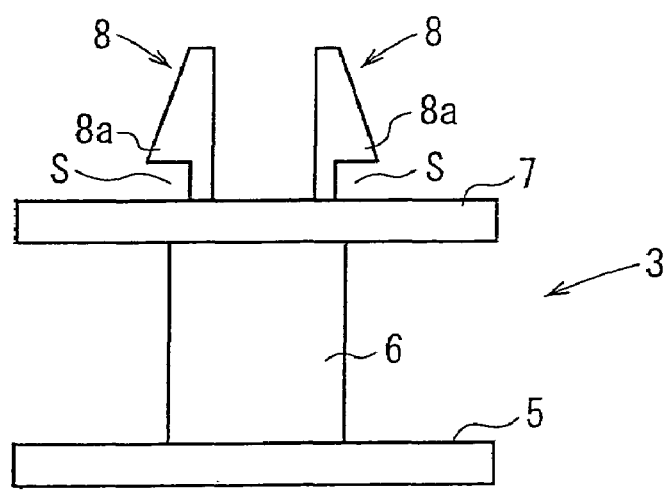
FIG. 1b is a side view of a first locking part of the attachment structure of the EA component.

A preferred embodiment of a first aspect will now be described with reference to FIGS. 1a to 2b. FIG. 1a is a cross-sectional view in the substantially horizontal direction showing an attachment structure of an EA component according to this embodiment. FIG. 1b is a side view of a first locking part of the attachment structure of the EA component.

Figure 2A:
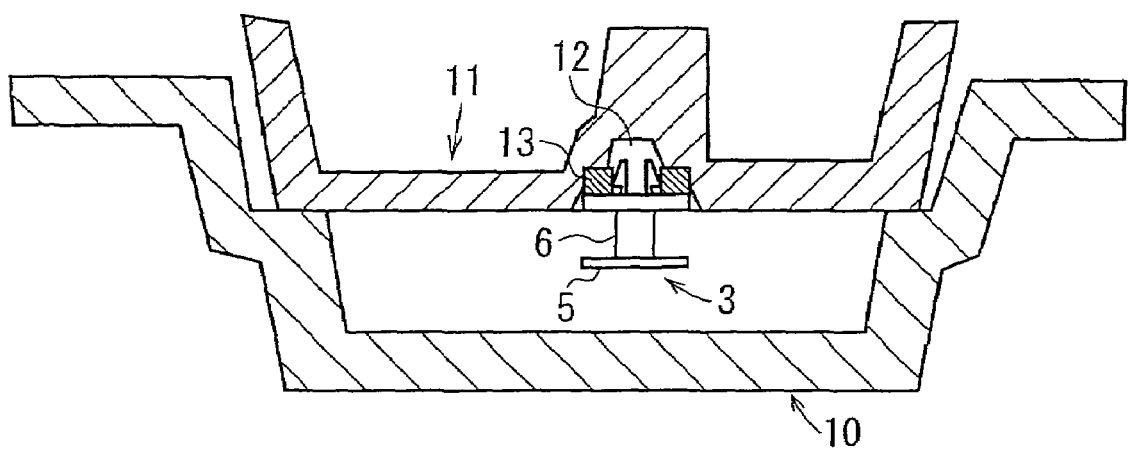
FIG. 2a is a cross-sectional view showing a method for producing the EA component with the first locking part of the first aspect.
Figure 2B:
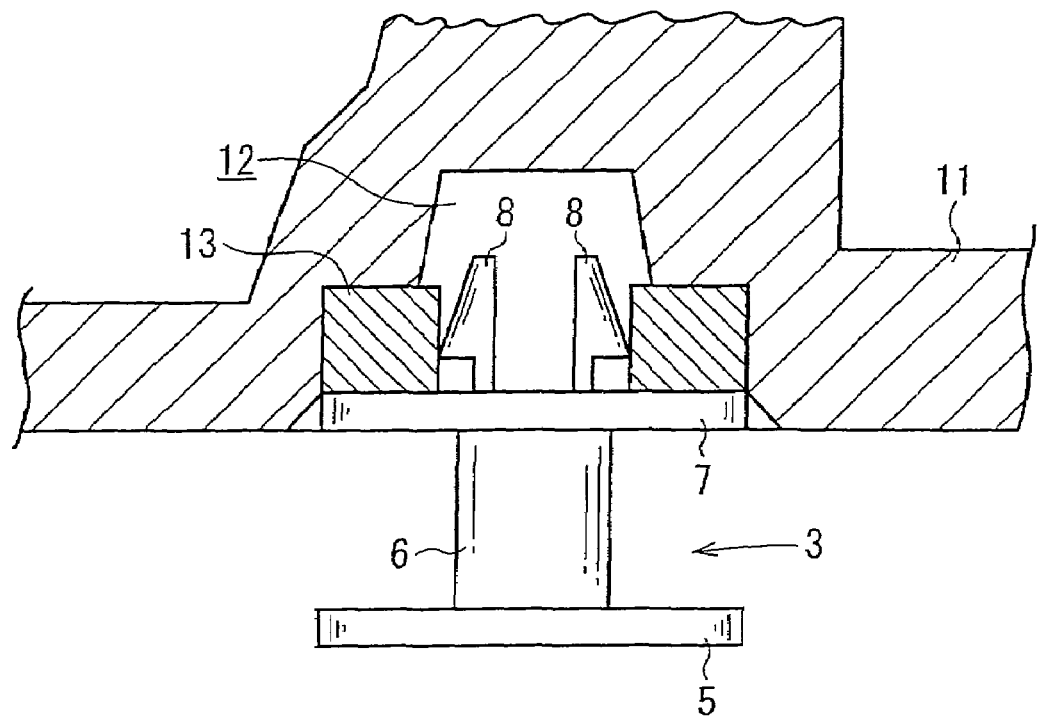
Figure 3:
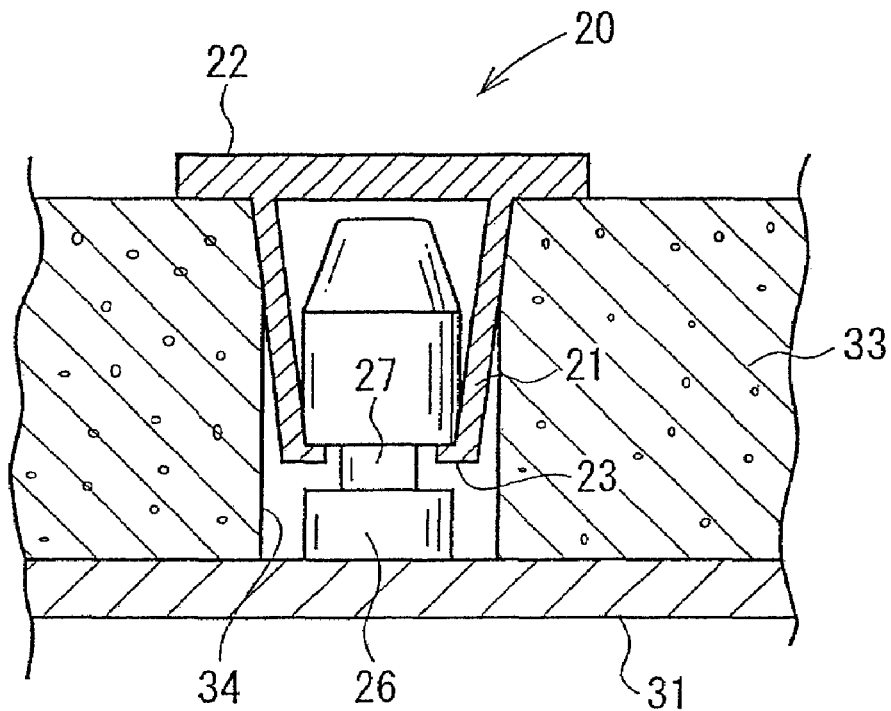
FIG. 3 is a cross-sectional view showing a known structure.
Figure 4A:
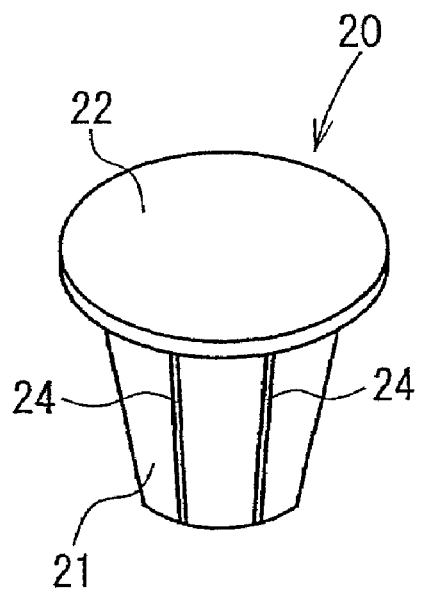
FIGS. 4a and 4b are explanatory views of the structure in FIG. 3.
Figure 4B:
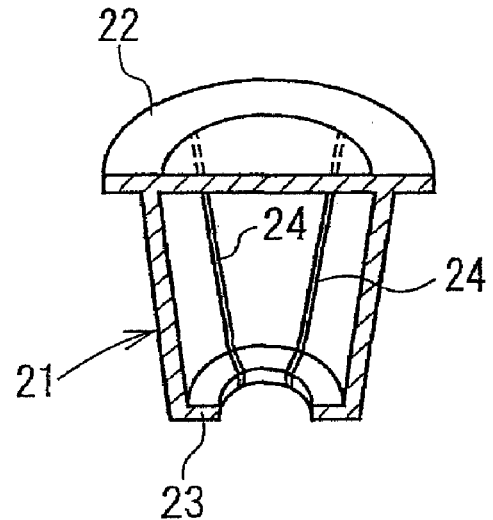

FIG. 2a is a cross-sectional view showing a method for producing the EA component with the first locking part. FIG. 2b is an enlarged view of a part of FIG. 2a.

Referring to FIG. 1a, a sheet-shaped EA component 1 composed of a synthetic resin such as rigid urethane foam is attached to a trim 2 (a door trim in this embodiment) serving as a member, with a first locking part 3 therebetween. In this embodiment, an opening 4 serving as a second locking part is provided in the trim 2. The first locking part 3 is engaged with the opening 4. Although the opening 4 preferably has a round shape, the shape of the opening 4 is not limited to this.

The first locking part 3 includes a cylindrical part 6, an anchor 5, a flange 7, and a plurality of projections 8 (two projections 8 are provided in this embodiment). The anchor 5 has a flange shape extending from the rear end of the cylindrical part 6 toward the outside. The flange 7 extends from the leading end of the cylindrical part 6 toward the outside. The projections 8 protrude from the leading end of the cylindrical part 6 in the direction parallel to the axis of the cylinder of the cylindrical part 6. These projections 8 face the opening 4 in the direction of the diameter of the opening 4. The number of the projections 8 is about 2 to about 4 for practical use.

Claw parts 8a extending in the lateral direction are provided on the side faces of the projections 8 in the projecting direction. A space S is formed between the claw parts 8a and the flange 7. The extending portion of the claw parts 8a in the lateral direction diverges toward the flange 7, in other words, the outer side faces of the projections 8 form a tapered shape. Consequently, the projections 8 can be readily inserted in the opening 4.

The first locking part 3 is formed as a single part using a synthetic resin. The projections 8 can be resiliently deformed in the approaching direction.

Ferromagnetic particles such as ferrite particles are dispersed in the synthetic resin forming the first locking part 3. Furthermore, a magnetization treatment is performed for the ferromagnetic particles to magnetize the first locking part 3. Therefore, the first locking part 3 can be magnetically held with a die used for molding the EA component 1.

As shown in FIG. 1a, the cylindrical part 6 and the anchor 5 of the first locking part 3 are embedded in the EA component 1. In this embodiment, the lower surface of the flange 7 and the surface of the EA component 1 are disposed at the same level. Alternatively, the upper surface of the flange 7 and the surface of the EA component 1 may be disposed at the same level. Furthermore, the lower half of the flange 7 may be embedded in the EA component 1, whereas the upper half of the flange 7 may be projected from the surface of the EA component 1. For example, as shown in FIG. 1a, when the flange 7 is projected from the surface of the EA component 1, the trim 2 is held between the claw parts 8a and the flange 7. Thus, the positional relationship between the EA component 1 and the trim 2 in the approaching or separating direction (i.e., in the vertical direction in FIG. 1a) is exclusively defined.

FIG. 1a shows only a single first locking part 3. However, two or more of the first locking parts 3 may be provided according to the dimension or the shape of the EA component 1. The positions of the first locking parts 3 are also determined according to the dimension or the shape of the EA component 1.

In order to attach the EA component 1 with the first locking part 3 to the trim 2, the EA component 1 with the first locking part 3 is set on the trim 2 while the projections 8 are inserted in the opening 4. When the EA component 1 is pressed on the trim 2, the projections 8 are pressed into the opening 4. The claw parts 8a are pressed on the inner periphery of the opening 4. As a result, the projections 8 are inserted in the opening 4 while bending in the approaching direction. After the claw parts 8a pass through the opening 4, the shape of the projections 8 is resiliently returned to the original shape. As a result, the side face of each projection 8 is resiliently pressed on the inner periphery of the opening 4. In addition, the claw parts 8a and the flange 7 hold the edge of the opening 4 disposed in the space S. Thus, the EA component 1 can be attached to the trim 2 by only a single step of overlapping the EA component 1 having the first locking part 3 with the trim 2. Accordingly, the efficiency of the attachment work is significantly improved. In addition, the plurality of the projections 8 of the first locking part 3 are resiliently pressed on the inner periphery of the opening 4, and the claw parts 8a of the projections 8 and the flange 7 hold the edge of the opening 4. As a result, the EA component 1 moves in the direction neither parallel nor orthogonal to the surface of the trim 2. This structure provides a very reliable attachment of the EA component 1.

As shown in FIG. 1a, the cylindrical part 6 and the anchor 5 of the first locking part 3 are embedded in the EA component 1. In this structure, the first locking part 3 does not pierce the EA component 1 and a sufficient thickness of the EA component 1 is provided even in the vicinity of the first locking part 3. Therefore, excellent characteristics of shock absorption by the EA component 1 can be provided even in the vicinity of the first locking part 3.

According to this attachment structure of the EA component 1, any arrangement or any number of the first locking parts 3 and the openings 4 may be used. Thus, any EA component having various shapes can be reliably attached to the trim by a simple method. Even when a flexible EA component is used, the EA component can be reliably fixed by increasing the number of the first locking parts 3 and the openings 4.

A method for producing the EA component 1 with the first locking part 3 will now be described with reference to FIGS. 2a and 2b. A die including a lower die 10 and an upper die 11 is used. The first locking part 3 is held on the surface of the cavity of the upper die 11 in advance, and a synthetic resin material is supplied in the cavity to form the EA component 1 with the first locking part 3. For example, when the synthetic resin material is composed of a urethane, a stock solution of the urethane is supplied in the lower die 10 and is foamed. Alternatively, an injection foam molding may be used.

A recess 12 that receives the projections 8 of the first locking part 3 is provided in the upper die 11, which holds the first locking part 3. A ring 13 is provided at the inlet of the recess 12. The ring 13 is composed of a ferromagnetic material, for example, an alloy such as an iron-cobalt alloy or a ceramic such as ferrite. Either the ring 13 or the first locking part 3 is magnetized in advance so that the first locking part 3 can be magnetically held with the ring 13. The ring 13 is normally magnetized. The ring 13 may be composed of an electromagnet.

The above forming is performed while the upper surface of the flange 7 is magnetically held with the lower surface of the ring 13. After the synthetic resin is cured in the die to a predetermined degree, the molded article is ejected from the die to prepare the EA component 1 with the first locking part 3.

Since the flange 7 is closely contacted with the ring 13 by magnetic attraction, the synthetic resin does not flow in the space between the flange 7 and the ring 13. Thus, the generation of a burr can be prevented.

The embodiment shown in FIGS. 1a and 1b is an example of the first aspect. The first aspect also includes other embodiments. For example, the shape of the flange 7 or the anchor 5 may have a shape other than that in the figures.

As described above, according to the first aspect, an EA component can be readily attached to a member such as a trim. According to the present invention, the characteristics of shock absorption by the EA component can be improved. In addition, the EA component can be reliably attached to the member regardless of the shape, the dimension, and the hardness of the EA component.

Figure 5A:
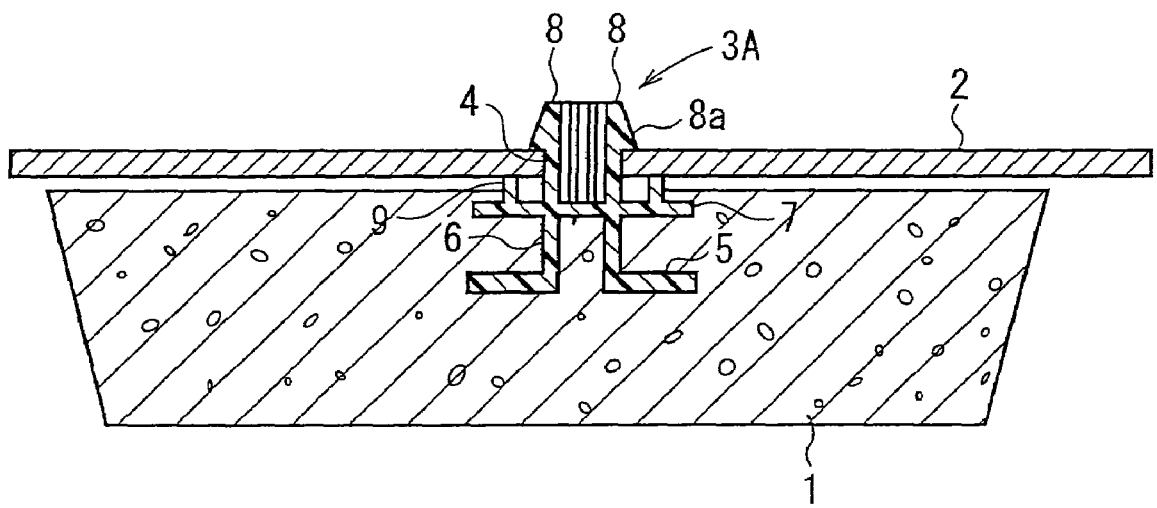
FIG. 5a is a cross-sectional view showing an attachment structure of an EA component according to a second aspect.
Figure 5B:
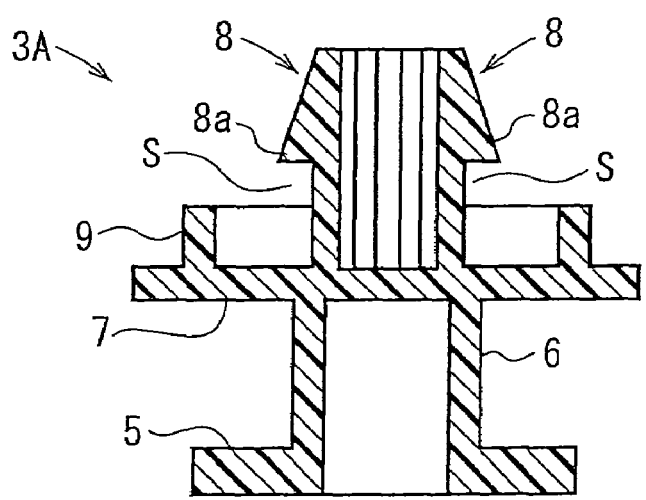
FIG. 5b is a longitudinal cross-section of a locking piece of the attachment structure of the EA component.
Figure 5C:
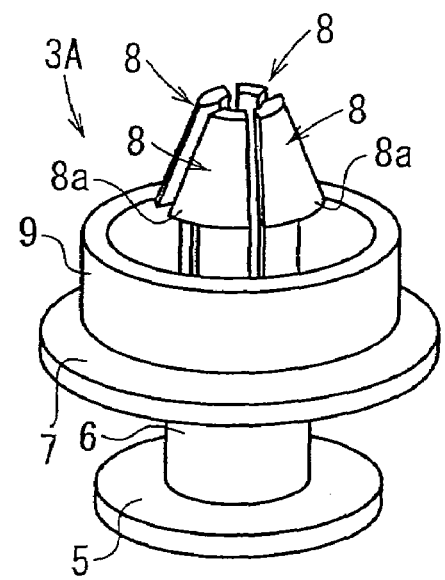
FIG. 5c is a perspective view of the locking piece.
Figure 6A:
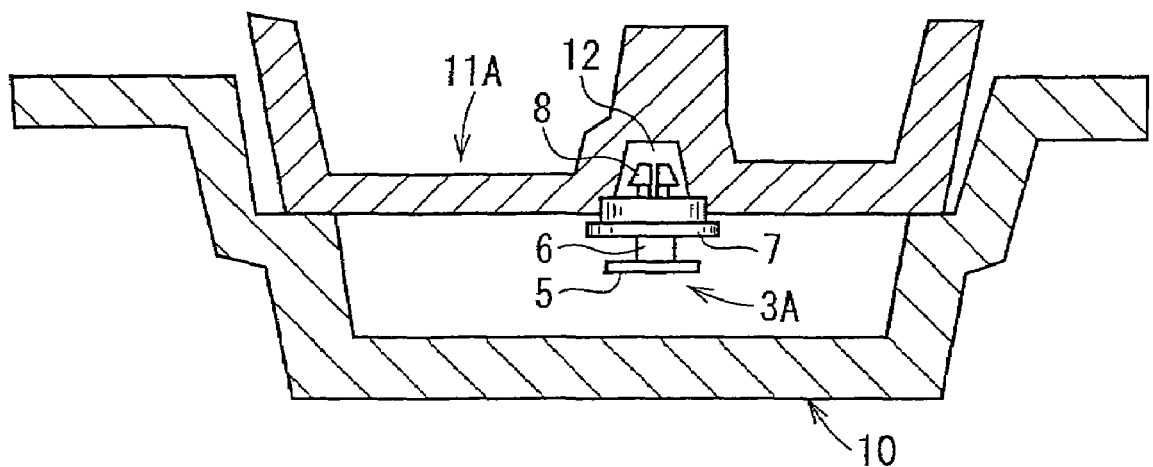
FIG. 6a is a cross-sectional view showing a method for producing the EA component with the locking piece of the second aspect.
Figure 6B:
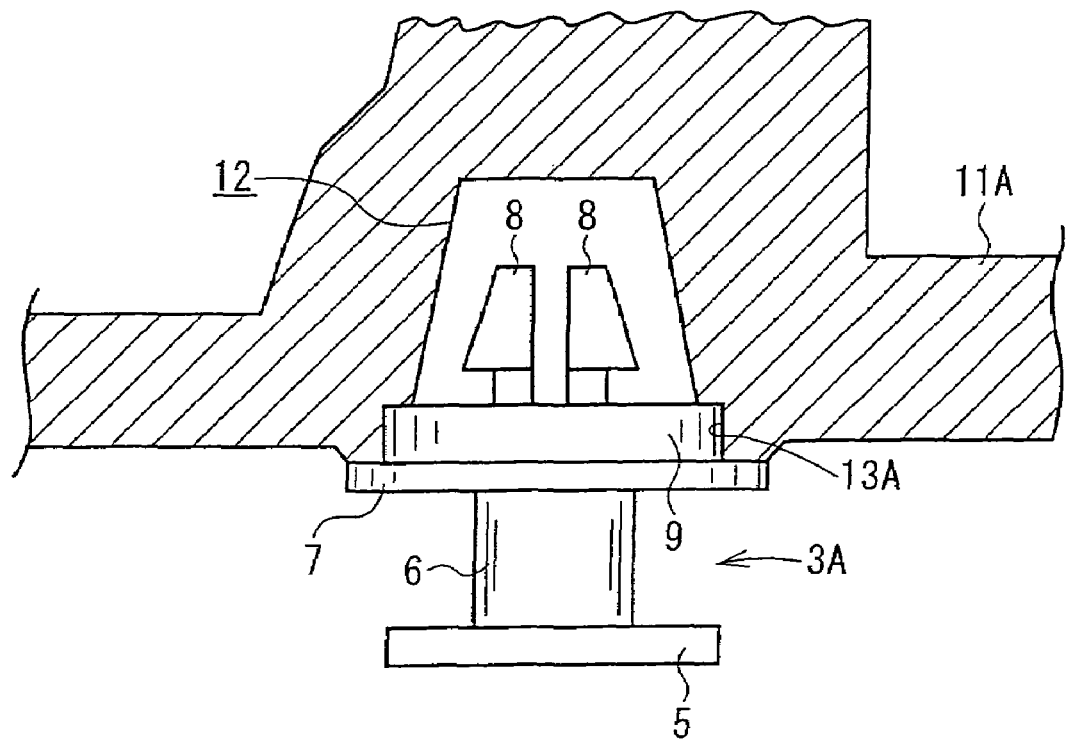

A preferred embodiment of a second aspect will now be described with reference to FIGS. 5a to 6b. FIG. 5a is a cross-sectional view in the substantially horizontal direction showing an attachment structure of an EA component according to this embodiment. FIG. 5b is a longitudinal cross-section of a locking piece serving as a first locking part used in this attachment structure of the EA component. FIG. 5c is a perspective view of the locking piece. FIG. 6a is a cross-sectional view showing a method for producing the EA component with the locking piece. FIG. 6b is an enlarged view of a part of FIG. 6a.

Referring to FIG. 5a, the sheet-shaped EA component 1 composed of a synthetic resin such as rigid urethane foam is attached to the trim 2 (a door trim in this embodiment) serving as a member, with a locking piece 3A therebetween. In this embodiment, the opening 4 serving as the second locking part is provided in the trim 2. The locking piece 3A is engaged with the opening 4. Although the opening 4 preferably has a round shape, the shape of the opening 4 is not limited to this.

The locking piece 3A includes the cylindrical part 6, the anchor 5, the flange 7, a plurality of projections 8 (four projections 8 are provided in this embodiment), and a surrounding wall 9. The anchor 5 has a flange shape extending from the rear end of the cylindrical part 6 toward the outside. The flange 7 extends from the leading end of the cylindrical part 6 toward the outside. The projections 8 protrude from the leading end of the cylindrical part 6 in the direction parallel to the axis of the cylinder of the cylindrical part 6. The surrounding wall 9 is disposed so as to surround the outside of a group of the projections 8. The surrounding wall 9 protrudes from the flange 7 in the same direction as that of the projections 8. The plurality of projections 8 (four projections 8 are provided in this embodiment) are provided so as to form an interval in the circumferential direction of the opening 4. The number of the projections 8 is about 2 to about 4 for practical use.

Claw parts 8a extending in the lateral direction are provided on the side faces of the projections 8 in the projecting direction. The extending portion of the claw parts 8a in the lateral direction diverges toward the flange 7, in other words, the outer side faces of the projections 8 form a tapered shape. Consequently, the projections 8 can be readily inserted in the opening 4.

The surrounding wall 9 has a ring shape. The height of the surrounding wall 9 is smaller than the distance between the flange 7 and the lower end of the claw parts 8a. As a result, a space S is formed between the claw parts 8a and the flange 7.

The locking piece 3A is formed as a single part using a synthetic resin. The projections 8 can be resiliently deformed in the centripetal direction.

As shown in FIG. 5a, the cylindrical part 6 and the anchor 5 of the locking piece 3A are embedded in the EA component 1. In this embodiment, the upper surface of the flange 7 disposed at the outer periphery of the surrounding wall 9 is embedded in the EA component 1. Alternatively, this portion may be exposed on the surface of the EA component 1. In any case, the upper end of the surrounding wall 9 is either disposed at the same level as the surface of the EA component 1 or projected from the surface of the EA component 1. The edge of the opening 4 of the trim 2 is held between the upper end of the surrounding wall 9 and the claw parts 8a. Thus, the positional relationship between the EA component 1 and the trim 2 in the approaching or separating direction (i.e., in the vertical direction in FIG. 5a) is exclusively defined.

FIG. 5a shows only a single locking piece 3A. However, two or more of the locking pieces 3A may be provided according to the dimension or the shape of the EA component 1. The positions of the locking pieces 3A are also determined according to the dimension or the shape of the EA component 1.

In order to attach the EA component 1 with the locking piece 3A to the trim 2, the EA component 1 with the locking piece 3A is set on the trim 2 while the projections 8 are inserted in the opening 4. When the EA component 1 is pressed on the trim 2, the projections 8 are pressed into the opening 4. The claw parts 8a are pressed on the inner periphery of the opening 4. As a result, the projections 8 are inserted in the opening 4 while bending in the approaching direction. After the claw parts 8a pass through the opening 4, the shape of the projections 8 is resiliently returned to the original shape. As a result, the side face of each projection 8 is resiliently pressed on the inner periphery of the opening 4. In addition, the claw parts 8a and the surrounding wall 9 hold the edge of the opening 4 disposed in the space S. Thus, the EA component 1 can be attached to the trim 2 by only a single step of overlapping the EA component 1 having the locking piece 3A with the trim 2. Accordingly, the efficiency of the attachment work is significantly improved. In addition, side faces of the projections 8 of the locking piece 3A are resiliently fitted to the inner periphery of the opening 4, and the claw parts 8a of the projections 8 and the upper end of the surrounding wall 9 hold the edge of the opening 4. As a result, the EA component 1 moves in the direction neither parallel nor orthogonal to the surface of the trim 2. This structure provides a very reliable attachment of the EA component 1.

As shown in FIG. 5a, the cylindrical part 6 and the anchor 5 of the locking piece 3A are embedded in the EA component 1. In addition, the cylindrical part 6 and the anchor 5 are disposed only in about half (for example, 30% to 50%) of the EA component 1 in the thickness direction. In this structure, the locking piece 3A does not pierce the EA component 1 and a sufficient thickness of the EA component 1 is provided even in the vicinity of the locking piece 3A. Therefore, excellent characteristics of shock absorption by the EA component 1 can be provided even in the vicinity of the locking piece 3A.

According to this attachment structure of the EA component 1, any arrangement or any number of the locking pieces 3A and the openings 4 may be used. Thus, any EA component having various shapes can be reliably attached to the trim by a simple method. Even when a flexible EA component is used, the EA component can be reliably fixed by increasing the number of the locking pieces 3A and the openings 4.

A method for producing the EA component 1 with the locking pieces 3A will now be described with reference to FIGS. 6a and 6b. A die including the lower die 10 and an upper die 11A is used. The locking pieces 3A is held on the surface of the cavity of the upper die 11A in advance, and a synthetic resin material is supplied in the cavity to form the EA component 1 with the locking pieces 3A. For example, when the synthetic resin material is composed of a urethane, a stock solution of the urethane is supplied in the lower die 10 and is foamed. Alternatively, an injection foam molding may be used.

A recess 12 that receives the projections 8 of the locking piece 3A is provided in the upper die 11A, which holds the locking piece 3A. An annular groove 13A in which the surrounding wall 9 is tightly fitted is provided at the inlet of the recess 12. The locking piece 3A can be held with the upper die 11A by tightly fitting the surrounding wall 9 in the groove 13A. In this embodiment, as shown in FIG. 6b, when the surrounding wall 9 is fitted in the groove 13A, the upper surface of the flange 7 disposed at the outside of the surrounding wall 9 is closely contacted with the lower surface of the upper die 11A. According to this structure, the locking piece 3A does not tilt and is reliably held with the upper die 11A.

The above forming is performed while the locking piece 3A is held with the upper die 11A. After the synthetic resin is cured in the die to a predetermined degree, the molded article is ejected from the die to prepare the EA component 1 with the locking piece 3A.

The surrounding wall 9 is tightly fitted in the groove 13A, and in addition, the flange 7 is closely contacted with the lower surface of the upper die 11A. This structure prevents the synthetic resin from flowing on the top face of the surrounding wall 9 or in the inside of the surrounding wall 9. Thus, the generation of a burr can be prevented.

The above embodiment is an example of the second aspect. The second aspect also includes embodiments other than that in the figures. For example, the shape of the flange 7 or the anchor 5 may have a shape other than that in the figures.

As described above, according to the second aspect, an EA component can be readily attached to a member such as a trim. According to the present invention, the characteristics of shock absorption by the EA component can be improved. In addition, the EA component can be reliably attached to the member regardless of the shape, the dimension, and the hardness of the EA component.

Embodiments of a third aspect will now be described with reference to FIGS. 7a to 13b.

Figure 7A:
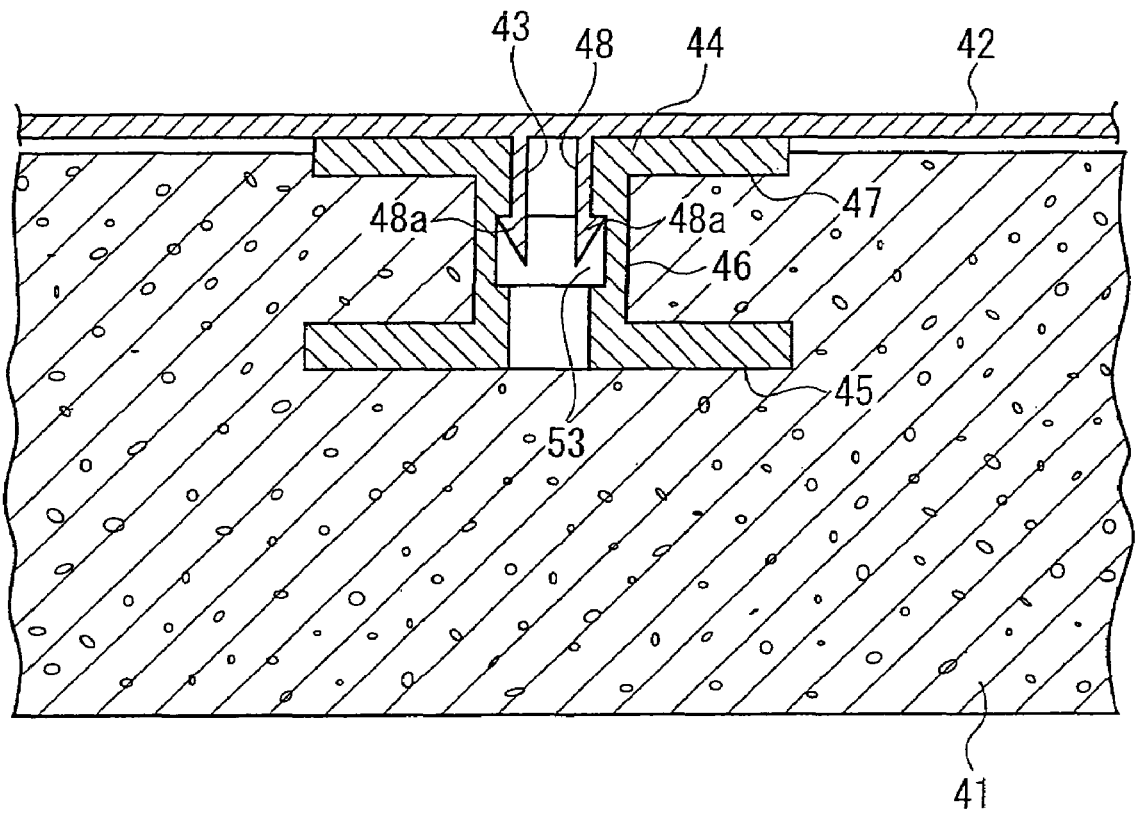
FIG. 7a is a cross-sectional view showing an attachment structure of an EA component according to a third aspect.
Figure 7B:
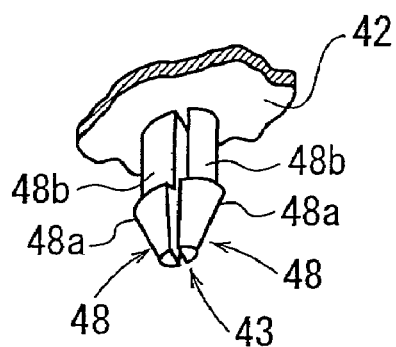
FIG. 7b is a perspective view of a second locking part of the attachment structure of the EA component.
Figure 7C:
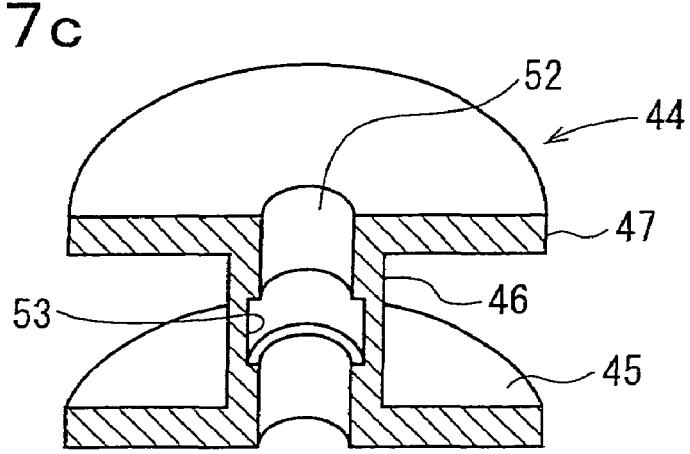
FIG. 7c is a sectional perspective view of a first locking part of the attachment structure of the EA component.
Figure 10:
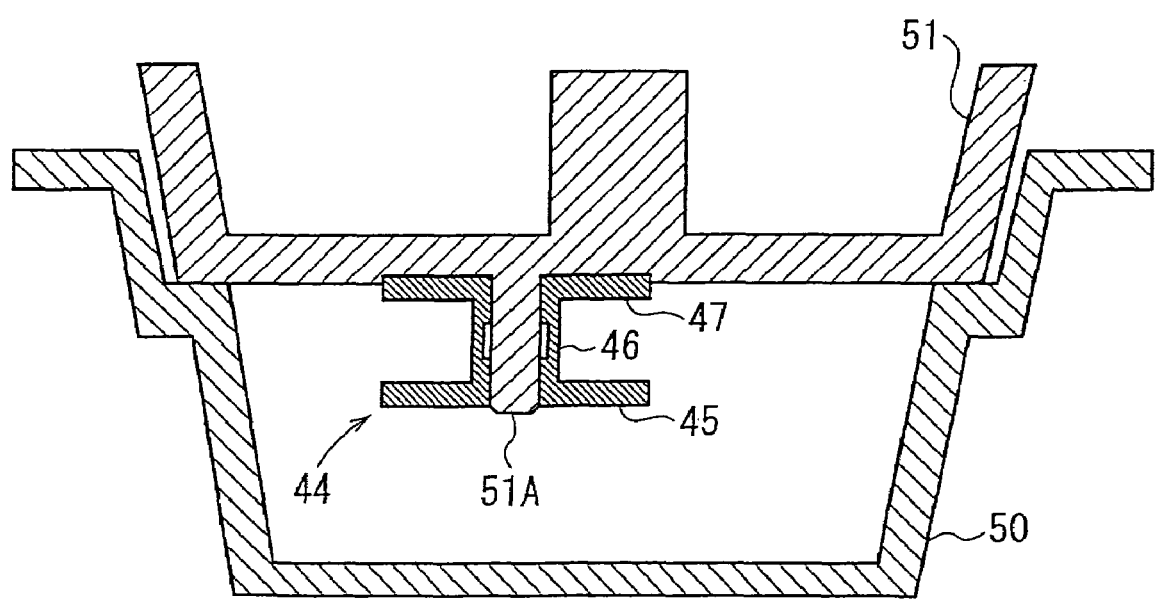
FIG. 10 is a cross-sectional view showing a method for producing the EA component with the first locking part of the third aspect.

FIG. 7a is a cross-sectional view in the substantially horizontal direction showing an attachment structure of an EA component according to an embodiment of the third aspect. FIG. 7b is a perspective view of a second locking part of the attachment structure of the EA component. FIG. 7c is a perspective view of a first locking part of the attachment structure of the EA component. FIG. 10 is a cross-sectional view showing a method for producing the EA component with the first locking part.

Referring to FIG. 7a, an EA component 41 composed of a synthetic resin such as rigid urethane foam is attached to a second locking part 43 of a trim 42 (a door trim in this embodiment) serving as a member. In this embodiment, a first locking part 44 is provided in the EA component 41 and the second locking part 43 is engaged with the first locking part 44.

The second locking part 43 includes a pair of projections 48 provided on the surface of the trim 42.

Claw parts 48a extending in the lateral direction are provided on the side faces of the projections 48 in the projecting direction. The rear end of the projections 48 forms semicircular column parts 48b. The extending portion of the claw parts 48a in the lateral direction diverges toward the semicircular column parts 48b. Thus, the projections 48 form a tapered shape. Consequently, the projections 48 can be readily inserted in an opening 52 of the first locking part 44, which will be described later.

The projections 48 are composed of a resilient synthetic resin. The projections 48 can be resiliently deformed in the approaching direction. Although the number of the projections 48 in FIGS. 7a and 7b is two, the number may be three or more. The number of the projections 48 is preferably 2 to 6 for practical use.

The first locking part 44 includes a cylindrical part 46, an anchor 45, and a flange 47. The anchor 45 has a flange shape extending from the rear end of the cylindrical part 46 toward the outside. The flange 47 extends from the leading end of the cylindrical part 46 toward the outside. The cylindrical opening 52 piercing the flange 47, the cylindrical part 46, and the anchor 45 is provided in the first locking part 44 in the direction of the central axis. A groove 53 is provided in the inner periphery of the cylindrical opening 52 in the circumferential direction. The distance (length) from the outer surface of the flange 47 to the groove 53 is equal to the length of the semicircular column parts 48b of the second locking part 43. The groove 53 preferably has a depth of about 0.2 to about 2 mm.

Ferromagnetic particles such as ferrite particles may be dispersed in the synthetic resin forming the first locking part 44. Thus, the first locking part 44 may be more strongly held with a die used for molding the EA component 41 by a magnetic force.

As shown in FIG. 7a, the cylindrical part 46 and the anchor 45 of the first locking part 44 are embedded in the EA component 41. In this embodiment, the lower half of the flange 47 is embedded in the EA component 41, whereas the upper half of the flange 47 is projected from the surface of the EA component 41. Alternatively, the lower surface of the flange 47 and the surface of the EA component 41 may be disposed at the same level. The upper surface of the flange 47 and the surface of the EA component 41 may be disposed at the same level. However, for example, as shown in FIG. 7a, when the upper surface of the flange 47 is projected from the surface of the EA component 41, a space is formed between the trim 42 and the EA component 41. In such a case, regardless of the surface smoothness of the EA component 41, the trim 42 can be closely contacted with the flange 47 directly.

FIG. 7a shows only a single first locking part 44. However, two or more of the first locking parts 44 may be provided according to the dimension or the shape of the EA component 41. The positions of the first locking parts 44 are also determined according to the dimension or the shape of the EA component 41.

In order to attach the EA component 41 with the first locking part 44 to the trim 42, the EA component 41 with the first locking part 44 is set on the trim 42 while the projections 48 are inserted in the opening 52. When the EA component 41 is pressed on the trim 42, the projections 48 are pressed into the opening 52. The claw parts 48a are pressed on the inner periphery of the opening 52. As a result, the projections 48 are inserted in the opening 52 while bending in the approaching direction. When the claw parts 48a reach the groove 53, the shape of the projections 48 is resiliently returned to the original shape. As a result, the claw parts 48a and the trim 42 hold the edge of the groove 53. The outer periphery of the semicircular column parts 48b of the projections 48 are fitted to the inner periphery of the opening 52 of the first locking part 44.

Thus, the EA component 41 can be attached to the trim 42 by only a single step of overlapping the EA component 41 having the first locking part 44 with the trim 42. Accordingly, the efficiency of the attachment work is significantly improved. In addition, the claw parts 48a of the projections 48 and the trim 42 hold the edge of the groove 53, and the outer periphery of the semicircular column parts 48b are fitted to the inner periphery of the opening 52. As a result, the EA component 41 moves in the direction neither parallel nor orthogonal to the surface of the trim 42. This structure provides a very reliable attachment of the EA component 41.

As shown in FIG. 7a, a part of the flange 47, the cylindrical part 46, and the anchor 45 of the first locking part 44 are embedded in the EA component 41. In this structure, the first locking part 44 does not pierce the EA component 41 and a sufficient thickness of the EA component 41 is provided even in the vicinity of the first locking part 44. Therefore, excellent characteristics of shock absorption by the EA component 41 can be provided even in the vicinity of the first locking part 44.

According to this attachment structure of the EA component 41, any arrangement or any number of the second locking parts 43 and the first locking parts 44 may be used. Thus, any EA component having various shapes can be reliably attached to the trim by a simple method. Even when a flexible EA component is used, the EA component can be reliably fixed by increasing the number of the second locking parts 43 and the first locking parts 44.

The inside diameter (i.e., diameter) of the opening 52 is preferably about 5 to about 30 mm. An excessively small inside diameter decreases the attachment strength of the EA component and prevents the projections 48 from being inserted smoothly. On the other hand, an excessively large inside diameter is not economical. The length (i.e., distance) from the inlet of the opening 52 to the edge of the groove 53 is preferably about 10 to about 30 mm. When this length is excessively small, a burr generated in the molding of the EA component may reach the groove. When this length is excessively large, the projections 48 must also be unnecessarily long.

A method for producing the EA component 41 with the first locking part 44 will now be described with reference to FIG. 10. A die including a lower die 50 and an upper die 51 is used. The first locking part 44 is held in a protrusion 51A of the upper die 51 in advance, and a synthetic resin material is supplied in the cavity to form the EA component 41 with the first locking part 44. For example, when the synthetic resin material is composed of a urethane, a stock solution of the urethane is supplied in the lower die 50 and is foamed. Alternatively, an injection foam molding may be used. The first locking part 44 is normally held with the protrusion 51A by a frictional force. Alternatively, as described above, the first locking part 44 may be held with the protrusion 51A by a magnetic force.

The above embodiment is an example of the third aspect. The present invention also includes embodiments other than that in the figures. For example, as will be described in the following, the shape of the flange or the anchor may have a shape other than that in FIGS. 7a to 7c.

Figure 8A:
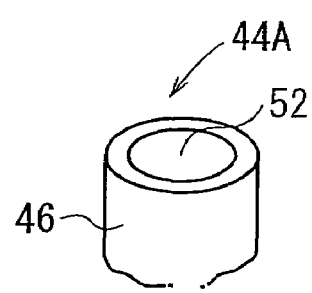
FIG. 8a is a partial perspective view showing the leading end of a first locking part according to an embodiment of the third aspect.
Figure 8B:
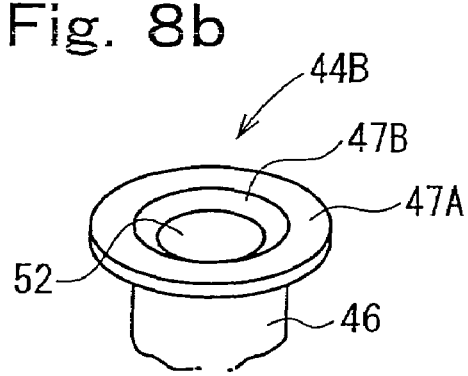
FIG. 8b is a partial perspective view showing the leading end of a first locking part according to an embodiment of the third aspect.
Figure 9A:
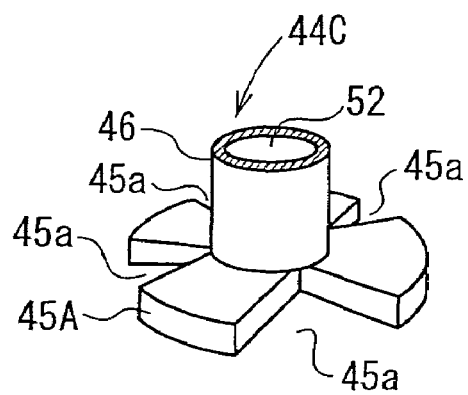
FIG. 9a is a partial perspective view showing the rear end of a first locking part according to an embodiment of the third aspect.
Figure 9B:
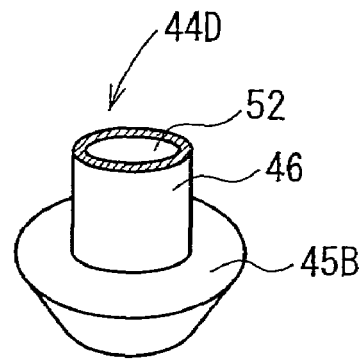
FIG. 9b is a partial perspective view showing the rear end of a first locking part according to an embodiment of the third aspect.

FIGS. 8a and 8b are partial perspective views showing two examples of the leading end of a first locking part according to other embodiments of the third aspect. FIGS. 9a and 9b are partial perspective views showing two examples of the rear end of a first locking part according to other embodiments of the third aspect. The same reference numerals as those in FIGS. 7a and 7c indicate the same parts.

A first locking part 44A in FIG. 8a does not include a flange. This first locking part 44A is preferably used in, for example, an inclined plane of an EA component or a place that does not have a sufficient area to provide a flange.

A first locking part 44B in FIG. 8b includes a tapered portion 47B disposed in the inner periphery of a flange 47A. The tapered portion 47B tapers from the upper surface of the flange 47A to the rear end of the first locking part 44B. When this first locking part 44B is used, the projections 48 of the second locking part 43 are led to the opening 52 with the tapered portion 47B. Therefore, the EA component can be readily attached to the trim.

According to a first locking part 44C in FIG. 9a, four notches 45a are provided in a circular anchor 45A. The first locking part 44C provides the following advantage: In the production of the EA component, a stock solution of, for example, a urethane is supplied in the lower die and is foamed. In this step, the urethane or the like is readily provided on the upper surface of the anchor 45A through the notches 45a. As a result, the anchor 45A is strongly bonded with the EA component 41.

According to a first locking part 44D in FIG. 9b, an anchor 45B has a mushroom-like shape in which the periphery tapers toward the rear end. In such a case, since the upper surface of the anchor 45B has a sufficient area, an excellent anchoring effect is provided. Furthermore, since the anchor 45B has the shape in which the periphery tapers from the upper surface to the rear end, the following advantage is provided: In the production of the EA component, a stock solution of, for example, a urethane is foamed. In this step, the urethane or the like is smoothly foamed from the rear end side of the anchor 45B toward the upper surface and is then readily provided toward the upper surface of the anchor 45B. As a result, the EA component 41 is strongly bonded with the anchor 45B.

Figure 11A:
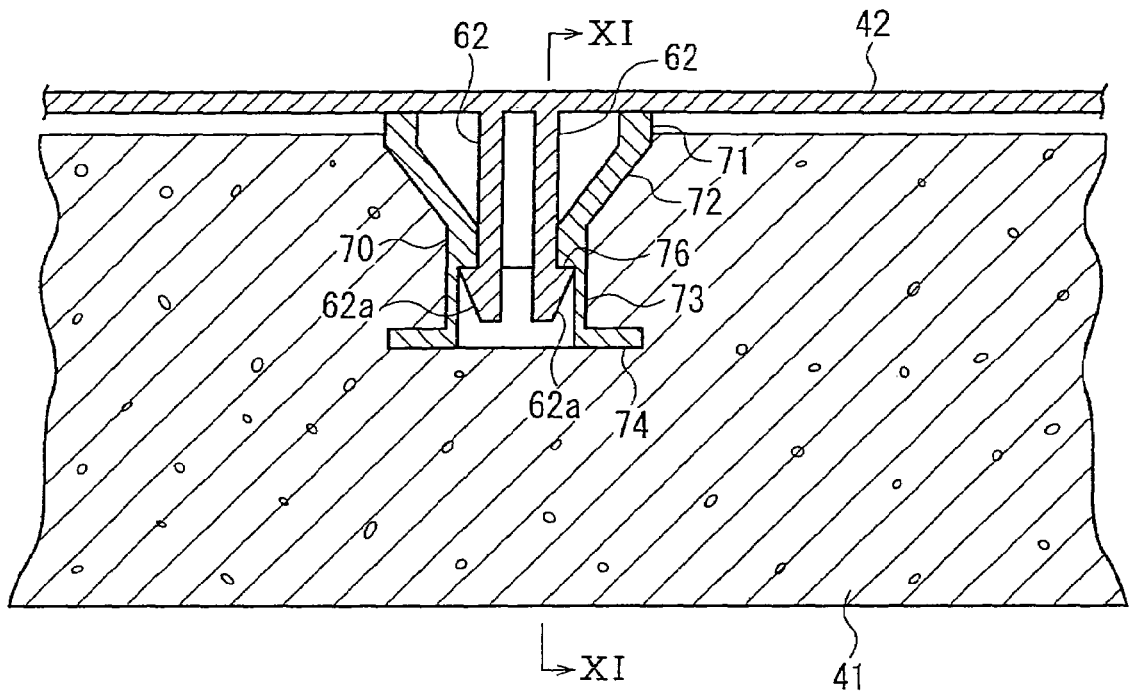
FIGS. 11a and 11b are cross-sectional views showing an embodiment of the third aspect.
Figure 11B:
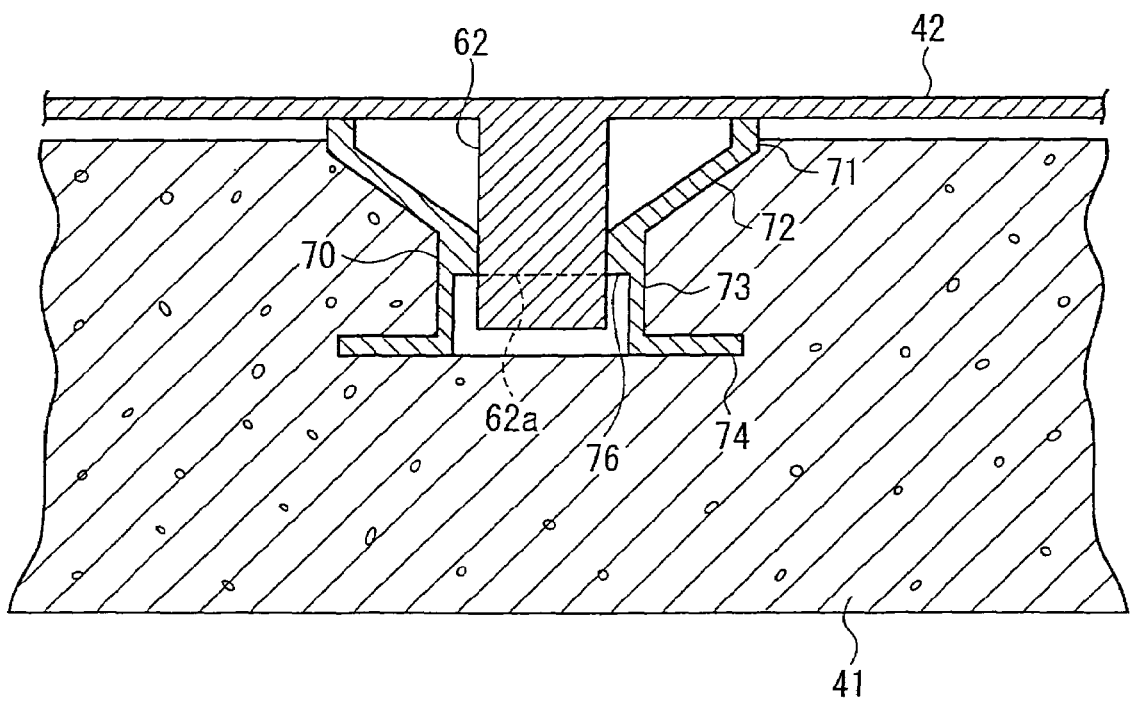
Figure 12A:
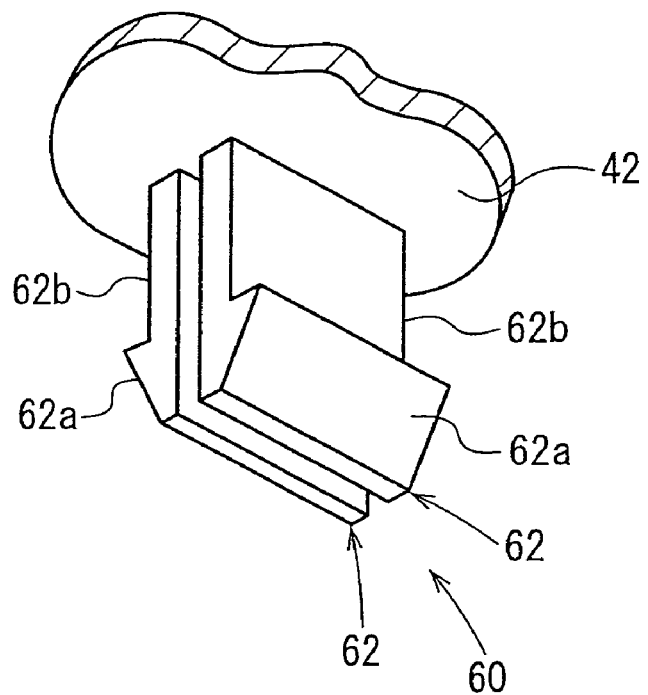
FIG. 12a is a perspective view of a second locking part in FIGS. 11a and 11b.
Figure 12B:
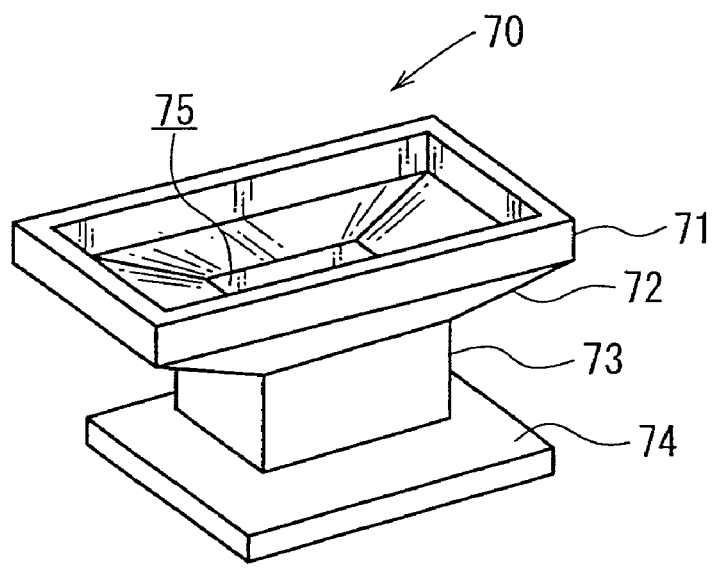
FIG. 12b is a perspective view of a first locking part in FIGS. 11a and 11b.

FIG. 11a is a cross-sectional view in the substantially horizontal direction showing an attachment structure of an EA component according to an embodiment of the third aspect. FIG. 11b is a cross-sectional view taken along line XI-XI in FIG. 11a. FIG. 12a is a perspective view of a second locking part in the attachment structure of the EA component. FIG. 12b is a perspective view of a first locking part in the attachment structure of the EA component.

Referring to FIG. 12a, a second locking part 60 includes a pair of projections 62 provided on the surface of the trim 42. These projections 62 substantially have a plate shape and are disposed such that the plate faces face each other. Claw parts 62a are provided on the outer plate faces of the projections 62 so as to extend in the opposite direction with respect to each other. The rear end of the projections 62 forms rectangular column parts 62b. The extending portion of the claw parts 62a in the lateral direction diverges toward the rectangular column parts 62b. In other words, the thickness of the plate forming the projections 62 tapers toward the leading end. Consequently, the projections 62 can be readily inserted in an opening 75 of a first locking part 70, which will be described later. 107 Referring to FIG. 12b, the first locking part 70 includes a rectangular tube 73, an anchor 74, a tapered portion 72, and a frame 71. The anchor 74 has a flange shape extending from the rear end of the rectangular tube 73 toward the outside. The tapered portion 72 diverges from the leading end of the rectangular tube 73 toward the trim 42. The frame 71 extends from the leading end of the tapered portion 72 in the direction parallel to the central axis of the rectangular tube 73.

Referring to FIGS. 11a and 11b, the opening 75 of the first locking part 70 pierces in the direction of the central axis of the rectangular tube 73. A groove 76 is provided on the inner surface of the opening 75. The groove 76 extends in the direction orthogonal to the central axis of the rectangular tube 73. The opening 75 has a rectangular section when cut in the direction orthogonal to the above central axis. The groove 76 is provided around the four sides of the rectangle. The groove 76 is provided such that the cross-sectional area of the opening 75 adjacent to the anchor 74 is larger than that of the opening 75 adjacent to the tapered portion 72. In this embodiment, the claw parts 62a are engaged with two faces of the groove 76 disposed along a pair of long sides of the rectangle.

The anchor 74, the rectangular tube 73, the tapered portion 72, and the lower half of the frame 71 of the first locking part 70 are embedded in the EA component 41, whereas the upper half (adjacent to the leading end) of the frame 71 is projected from the surface of the EA component 41.

According to this embodiment, the EA component 41 is attached to the trim 42 by inserting the second locking part 60 in the first locking part 70. When the second locking part 60 is inserted in the first locking part 70, the claw parts 62a and the trim 42 hold the edge of the groove 76.

In this embodiment, as shown in FIG. 11b, the width of the projections 62 is almost the same as the long sides of the rectangle disposed directly on the groove 76 of the opening 75. As a result, when the second locking part 60 is engaged with the first locking part 70, the displacement of the second locking part 60 in the horizontal direction in FIG. 11b can be prevented.

In the attachment structure of the EA component according to this embodiment, because of the substantially rectangular column shape, the second locking part 60 can be readily molded, compared with the second locking part 43 shown in FIG. 7b. In addition, since the first locking part 70 includes the tapered portion 72, the second locking part 60 can be readily inserted in the first locking part 70.

According to this embodiment, since the leading end of the first locking part 70 is projected from the surface of the EA component 41, a space is formed between the trim 42 and the EA component 41. As a result, regardless of the surface smoothness of the EA component 41, the trim 42 can be closely contacted with the frame 71 directly. Accordingly, the attachment accuracy of the trim 42 and the frame 71 depends only on the fitting accuracy of the second locking part 60 and the first locking part 70. Therefore, a deformation or a variation in the EA component 41 within a dimensional tolerance does not affect the attachment.

Although the outer surfaces of the first locking part 70 according to the above embodiment include an angular shape, the first locking part 70 may have rounded corners. For example, four corners of the anchor 74, four corners of the rectangular tube 73, and four corners of the frame 71 may be rounded corners. Such a shape provides the following advantage: In order to produce the EA component 41 with the first locking part 70, the first locking part 70 is held in a die in advance and a stock solution of, for example, a urethane is supplied in the die and is foamed. In this step, since the foamed urethane is readily provided around the rounded portions of the first locking part, the urethane is satisfactorily filled in the vicinity of the first locking part. As a result, the first locking part is strongly bonded with the EA component.

Figure 13A:
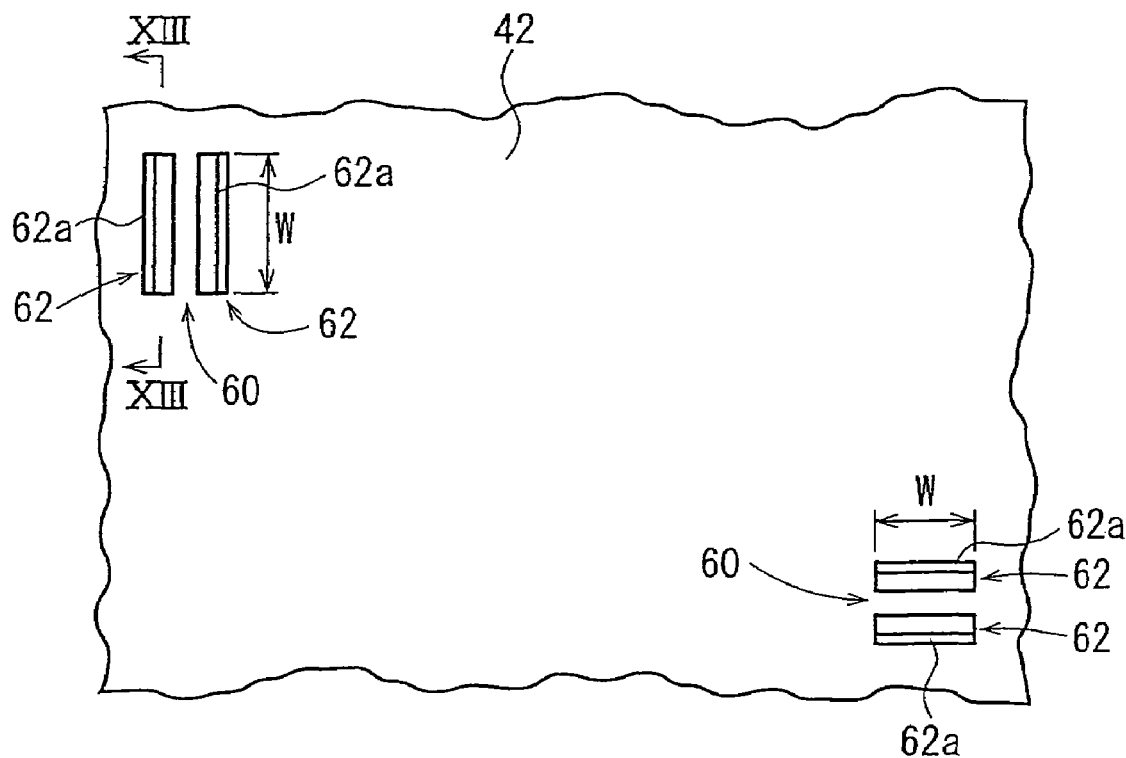
FIGS. 13a and 13b are explanatory views of an embodiment of the third aspect.
Figure 13B:
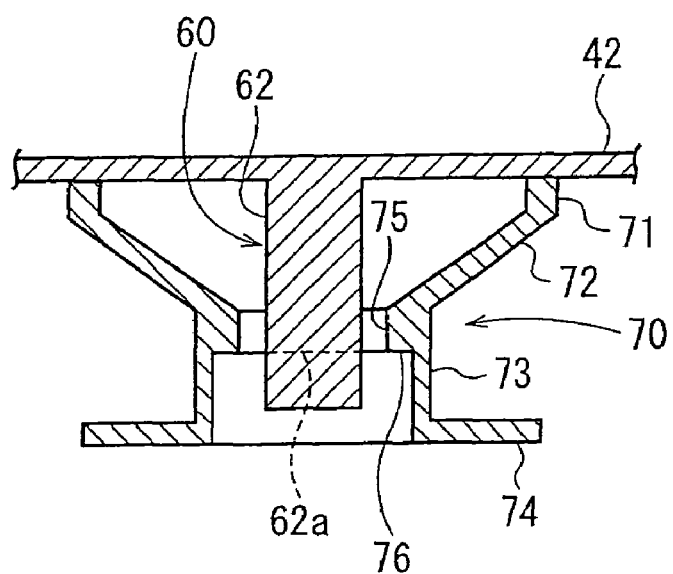

FIG. 13a is a plan view of a trim used in an attachment structure of an EA component according to an embodiment of the third aspect. FIG. 13b is a cross-sectional view showing the state wherein a second locking part 60 is engaged with a first locking part 70. FIG. 13b is a cross-sectional view taken along line XIII-XIII in FIG. 13a showing the state wherein the second locking part is engaged with the first locking part, and shows a cross-section of the same part as that in FIG. 11b.

According to this embodiment, a plurality of second locking parts 60 is provided such that the directions of plate faces of plate-shaped projections 62 of the second locking parts 60 are orthogonal with respect to each other. Referring to FIG. 13a, in the second locking part 60 disposed at the upper left, the plate faces of the projections 62 are directed in the vertical direction (the Y direction) in the figure. On the other hand, in the second locking part 60 disposed at the lower right, the plate faces of the projections 62 are directed in the horizontal direction (the X direction) in the figure.

According to this embodiment, as shown in FIGS. 13a and 13b, the width W of the projection 62 in the plate face direction (i.e., the width of the projection 62 in the direction orthogonal to the inserting direction in the opening 75) is smaller than the width at the position located directly on the groove 76 of the opening 75 in the direction orthogonal to the inserting direction. As a result, a space is formed between the side edge of the projection 62 and the inner surface of the opening 75.

In the EA component 41 (not shown in FIGS. 13a and 13b), equivalent first locking parts 70 are disposed at the positions facing the corresponding second locking parts 60. The second locking parts 60 are inserted in the corresponding first locking parts 70, thereby attaching the EA component 41 to the trim 42.

According to this attachment structure of the EA component, as shown in FIG. 13b, the width W of the projection 62 is smaller than the width of the opening 75. Therefore, even if the relative positions of the second locking part 60 and the corresponding first locking part 70 are somewhat offset in the X direction or in the Y direction, the second locking part 60 can be engaged with the first locking part 70.

Although FIG. 13a shows two second locking parts 60, three or more of the second locking parts 60 may be provided on a trim.

In the above embodiments, only the top face of the first locking part 44 or 70 is in contact with the trim 42 and the EA component 41 is out of contact with the trim 42 as a whole. Alternatively, a part of the EA component 41 may be brought into contact with the trim 42 directly. This structure stabilizes the attachment of the EA component.

Figure 14:
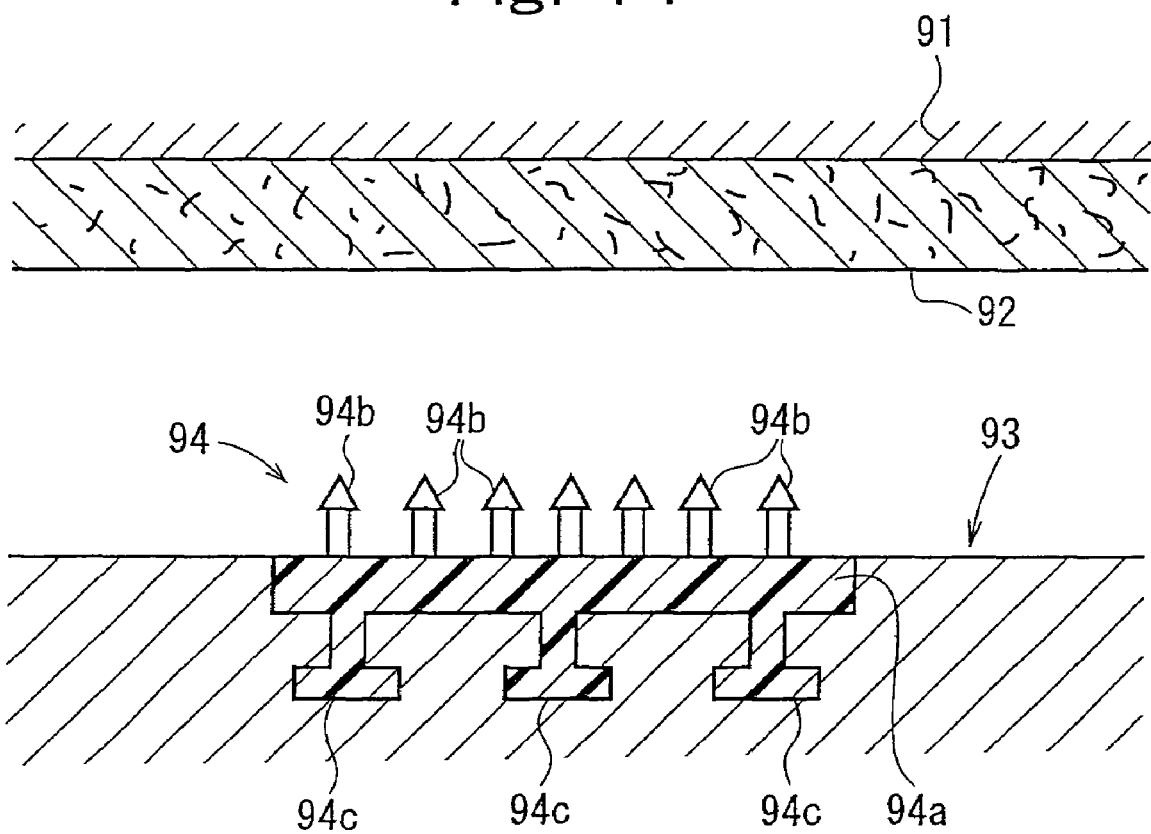
FIG. 14 is a cross-sectional view showing an attachment structure of an EA component according to an embodiment of a fourth aspect.
Figure 15:
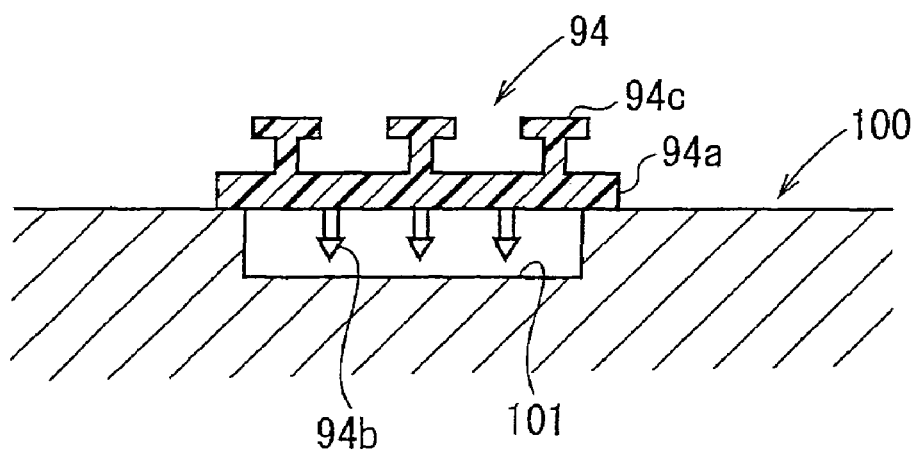
FIG. 15 is a cross-sectional view showing a method for producing the EA component with a planar fastener of the fourth aspect.

Embodiments of a fourth aspect will now be described with reference to FIGS. 14 and 15. FIG. 14 is an exploded view of an attachment structure of an EA component according to an embodiment of the fourth aspect. FIG. 15 is a cross-sectional view showing a method for producing the EA component with a planar fastener.

Referring to FIG. 14, a non-woven fabric 92 is bonded on the surface of a trim 91 with an adhesive such as a hot melt adhesive. In this embodiment, an EA component 93 is composed of rigid urethane foam and has a planar fastener 94 thereon. The planar fastener 94 includes a flat base 94a, engaging projections 94b extending from the top face of the base 94a, and anchors 94c extending from the back-side of the base 94a.

Each of the engaging projections 94 includes a narrow rod disposed at the rear end and an expanding head disposed at the leading end. The expanding head extends in the lateral direction from the narrow rod disposed at the rear end. The expanding head has a tapered shape so that the dimension of the expanding head is gradually decreased toward the leading end. This tapered expanding head extends in the lateral direction from the narrow rod. Therefore, when the engaging projections 94b are pressed into the non-woven fabric 92, the expanding heads are entwined with the fabric in the non-woven fabric 92. As a result, the engaging projections 94b do not separate from the non-woven fabric 92.

The planar fastener 94 is provided such that the top face of the base 94a is disposed at the same level as the surface of the EA component 93. The anchors 94c are embedded in the EA component 93. Each of the anchors 94c includes a flange-shaped expanding portion at the leading end. The anchors 94c prevent the planar fastener 94 from separating from the EA component 93.

The EA component 93 with the planar fastener 94 is pressed on the non-woven fabric 92 disposed on the surface of the trim 91 so as to insert the engaging projections 94b in the non-woven fabric 92. Because of the tapered shape, the engaging projections 94b are inserted in the non-woven fabric 92 smoothly. The inserted engaging projections 94b are entwined with the fabric in the non-woven fabric 92. Thus, the EA component is combined with the non-woven fabric 92, with the planar fastener 94 therebetween. The height of the engaging projections 94b is smaller than the thickness of the non-woven fabric 92.

The number of the planar fasteners 94 and the arrangement thereof are determined according to the dimension or the shape of the EA component 93.

As described above, according to this embodiment, the EA component 93 with the planar fastener 94 can be attached to the trim 91 by only pressing the EA component 93 on the non-woven fabric 92 provided on the surface of the trim 91. Accordingly, the efficiency of the attachment work is excellent.

In addition, as shown in FIG. 14, the anchors 94c of the planar fastener 94 do not pierce the EA component 93. In other words, the height of the anchors 94c is sufficiently smaller than the thickness of the EA component 93. For example, the height of the anchors 94c is 50% or less of the thickness of the EA component 93. Therefore, a sufficient thickness of the EA component 93 is provided even in the vicinity of the planar fastener 94. As a result, satisfactory characteristics of shock absorption can be provided even in the vicinity of the planar fastener 94.

A method for producing the EA component 93 with the planar fastener 94 will now be described with reference to FIG. 15. A die 100 having a recess 101 is used. The recess 101 is provided on the cavity and receives the engaging projections 94b. The engaging projections 94b are disposed in the recess 101 so that the recess 101 is covered with the base 94a. In this state, a stock solution of a urethane is supplied in the die 100 and is foamed.

The planar fastener 94 is composed of a synthetic resin. Preferably, magnetic particles such as ferrite particles are mixed in the synthetic resin, and in addition, a magnet is provided in the die. Thus, the planar fastener 94 is magnetically held with the die 100. In such a case, since the base 94a of the planar fastener 94 reliably covers the recess 101, the flowing of the urethane in the recess 101 can be prevented. Furthermore, even when the planar fastener 94 receives a foam pressure, the planar fastener 94 does not move on the surface of the die 100.

Although the trim 91 and the EA component 93 have a planar surface in FIG. 14, the trim 91 and the EA component 93 may have a curved surface. Although the engaging projections 94b have a mushroom shape, the engaging projections 94b may have a J letter shape.

In FIG. 14, in the base 94a of the planar fastener 94, the surface having the engaging projections 94b is disposed at the same level as the surface of the surrounding EA component 93. Alternatively, the surface of the base 94a having the engaging projections 94b may be partially projected from the surface of the surrounding EA component 93 or further embedded in the surface of the EA component 93.

As described above, according to the fourth aspect, an EA component can be readily attached to a member such as a trim. According to the present invention, the characteristics of shock absorption by the EA component can be improved. In addition, the EA component can be reliably attached to the member regardless of the shape, the dimension, and the hardness of the EA component.

What is claimed is:

1. An attachment structure of an EA component for attaching the EA component to a member, wherein:
the EA component is attached to the member by engaging a first locking part that is integrated with the EA component with a second locking part provided in the member;
the EA component comprises a urethane foam;
the first locking part is integrated with the urethane foam; and
the first locking part comprises a projection that engages with the second locking part and a surrounding wall that surrounds the rear end portion of the projection.

2. The attachment structure of an EA component according to claim 1, wherein the first locking part can be resiliently deformed, and when engaged with the second locking part, the first locking part is resiliently deformed and is then resiliently restored to engage with the second locking part.

3. The attachment structure of an EA component according to claim 2, wherein the second locking part is an opening.

4. The attachment structure of an EA component according to claim 3, wherein the first locking part comprises a claw part engaged with the edge of the opening.

5. The attachment structure of an EA component according to claim 4, wherein the first locking part comprises a projection projecting from the EA component and the claw part is provided on the side face of the projection in the projecting direction.

6. The attachment structure of an EA component according to claim 5, wherein a plurality of the projections is provided along the edge of the opening.

7. The attachment structure of an EA component according to claim 5, wherein the first locking part comprises a flange and the edge of the opening is held between the flange and the claw part.

8. The attachment structure of an EA component according to claim 5, wherein a base of the first locking part is embedded in the EA component.

9. The attachment structure of an EA component according to claim 8, wherein the base of the first locking part is embedded so as not to pierce the EA component.

10. The attachment structure of an EA component according to claim 1, wherein the first locking part can be magnetically held with a die used for molding the EA component.

11. The attachment structure of an EA component according to claim 1, wherein the projection can be resiliently deformed, and when engaged with the second locking part, the projection is resiliently deformed and is then resiliently restored to engage with the second locking part.

12. The attachment structure of an EA component according to claim 11, wherein the second locking part is an opening.

13. The attachment structure of an EA component according to claim 12, wherein the projection comprises a claw part engaged with the edge of the opening.

14. The attachment structure of an EA component according to claim 13, wherein the claw part is provided on the side face of the projection in the projecting direction.

15. The attachment structure of an EA component according to claim 14, wherein a plurality of the projections is provided along the edge of the opening.

16. The attachment structure of an EA component according to claim 14, wherein the first locking part comprises a flange, the projection and the surrounding wall are disposed so as to be projected from the flange, and the edge of the opening is held between the leading end of the surrounding wall and the claw part.

17. An attachment structure of an EA component for attaching the EA component to a member, wherein:
the EA component is attached to the member by engaging a first locking part that is integrated with the EA component with a second locking part provided in the member;

the first locking part comprises a projection that engages with the second locking part and a surrounding wall that surrounds the rear end portion of the projection; and a base of the first locking part is embedded in the EA component.

18. The attachment structure of an EA component according to claim 17, wherein the base of the first locking part is embedded so as not to pierce the EA component.

19. The attachment structure of an EA component according to claim 1, wherein the surrounding wall has an annular shape.

20. The attachment structure of an EA component according to claim 1, wherein the urethane foam is not provided in the inside of the surrounding wall.

21. A locking piece for attaching an EA component comprising:

a base embedded in the EA component;

a flange provided at one end of the base;

a plurality of projections projected from the flange, the projections being able to be resiliently deformed, and the projections being inserted in an opening for attaching the EA component;

claw parts provided on the side face of the projections, the claw parts being able to be engaged with the edge of the opening; and a surrounding wall projected from the flange in the same direction as that of the projections, the surrounding wall surrounding the rear end portion of the projections.

22. The locking piece according to claim 21, wherein the claw parts of the projections are disposed at a further end of the leading end of the surrounding wall in the projecting direction.

23. An attachment structure of an EA component for attaching the EA component to a member, wherein:

the EA component is attached to the member by engaging a first locking part that is integrated with the EA component with a second locking part provided in the member;

the first locking part comprises a projection that engages with the second locking part and a surrounding wall that surrounds the rear end portion of the projection; and the first locking part is a locking piece for attaching an EA component, the locking piece comprising:

a base embedded in the EA component;

a flange provided at one end of the base;

a plurality of projections projected from the flange, the projections being able to be resiliently deformed, and the projections being inserted in an opening for attaching the EA component;

claw parts provided on the side face of the projections, the claw parts being able to be engaged with the edge of the opening; and a surrounding wall projected from the flange in the same direction as that of the projections, the surrounding wall surrounding the rear end portion of the projections.

24. The attachment structure of an EA component according to claim 2, wherein the first locking part comprises a tube-shaped opening in which the second locking part is inserted and a groove provided in the inner periphery of the tube-shaped opening in the circumferential direction, and the second locking part is engaged with the groove.

25. The attachment structure of an EA component according to claim 24, wherein the second locking part comprises a claw part engaging with the edge of the groove.

26. The attachment structure of an EA component according to claim 25, wherein the second locking part is a projection projecting from the member and the claw part is provided on the side face of the projection in the projecting direction.

27. The attachment structure of an EA component according to claim 26, wherein a plurality of the projections is inserted in the single tube-shaped opening.

28. The attachment structure of an EA component according to claim 26, wherein the edge of the groove is held between the member and the claw part.

29. The attachment structure of an EA component according to claim 26, wherein most of the first locking part is embedded in the EA component and only the leading end face of the first locking part is projected from the EA component.

30. The attachment structure of an EA component according to claim 29, wherein the first locking part is embedded so as not to pierce the EA component.

31. The attachment structure of an EA component according to claim 24, wherein the tube-shaped opening is a cylindrical opening.

32. The attachment structure of an EA component according to claim 24, wherein the tube-shaped opening is a rectangular tube opening.

33. The attachment structure of an EA component according to claim 32, wherein a section of the rectangular tube opening in the direction orthogonal to the central axis of the tube is a rectangle and the groove is provided in the direction of the long sides of the rectangle.

34. The attachment structure of an EA component according to claim 33, wherein the EA component is attached to the member with a plurality of pairs of the second locking parts and the first locking parts, and at least two pairs of the second locking parts and the first locking parts are disposed such that the directions of the long sides of the rectangle in the rectangular tube opening are orthogonal with respect to each other.

35. The attachment structure of an EA component according to claim 33, wherein the width of the claw part in the direction parallel to the groove is smaller than the width of the groove.

36. The attachment structure of an EA component according to claim 24, wherein the inlet of the tube-shaped opening has a tapered shape gradually tapered toward the inside.

37. The attachment structure of an EA component according to claim 36, wherein the end of the inlet of the tube-shaped opening extends in the direction substantially parallel to the central axis of the tube.

38. The attachment structure of an EA component according to claim 24, wherein a part of the EA component is in contact with the member.

39. The attachment structure of an EA component according to claim 1, wherein the member is a trim of an automobile.

40. The attachment structure of an EA component according to claim 1, wherein a non-woven fabric serving as the second locking part is provided on the surface of the member, the surface to which the EA component being attached, and a planar fastener serving as the first locking part is fixed on the surface of the EA component, the planar fastener being integrated with the EA component during the molding of the EA component with foaming, and the EA component is attached to the surface of the member by entwining the planar fastener with the non-woven fabric.

41. The attachment structure of an EA component according to claim 40, wherein the planar fastener comprises engaging projections that are entwined with the non-woven fabric.

42. The attachment structure of an EA component according to claim 40, wherein anchors are provided on the backside of the planar fastener and the anchors are embedded in the EA component.

43. The attachment structure of an EA component according to claim 42, wherein the anchors are embedded so as not to pierce the EA component.

44. The attachment structure of an EA component according to claim 40, wherein the EA component comprises rigid urethane foam.

45. The attachment structure of an EA component according to claim 40, wherein the non-woven fabric is bonded on the surface of the member.

46. The attachment structure of an EA component according to claim 40, wherein the surface of the member is a back-side of a roof component of an automobile.

47. The attachment structure of an EA component according to claim 1, wherein the urethane foam is a rigid urethane.

* * * * *